United States Patent [19]

Nauman et al.

[11] Patent Number: 5,198,471
[45] Date of Patent: Mar. 30, 1993

[54] POLYMER RECYCLING BY SELECTIVE DISSOLUTION

[75] Inventors: E. Bruce Nauman, Schenectady; Jerry C. Lynch, Scotia, both of N.Y.

[73] Assignee: Rensselaer Polytechnic Institute, Troy, N.Y.

[21] Appl. No.: 406,087

[22] Filed: Sep. 11, 1989

[51] Int. Cl.$^5$ .......................... C08J 11/08; C08F 6/04
[52] U.S. Cl. ..................................... 521/46.5; 521/40; 521/40.5; 521/46; 521/47; 521/48; 525/191; 525/197; 528/494; 528/491; 528/497; 528/501; 264/37; 523/340
[58] Field of Search ................ 521/40, 40.5, 46, 46.5, 521/47, 48; 528/491, 494, 497, 501; 523/340; 525/191, 197; 264/37

[56] References Cited

U.S. PATENT DOCUMENTS 4,031,039  6/1977  Mizumoto et al. ................. 521/46.5
4,594,371  6/1986  Nauman ............................... 523/340

FOREIGN PATENT DOCUMENTS 0207628  3/1984  Fed. Rep. of Germany ........ 521/47

OTHER PUBLICATIONS

F. W. Billmeyer, Jr., Textbook of Polymer Science (2nd ed.) J. Wiley and Sons, N.Y., 51, 1971.
"Recycling of Thermoplastic Waste: Phase Equilibrium in Polystyrene-PVC-. . . " Polymer Engineering and Science, Apr. 1976, vol. 16, No. 4, pp. 246–251.

Primary Examiner—Fred Teskin
Attorney, Agent, or Firm—Notaro & Michalos

[57] ABSTRACT

A method for separating polymers from a physically commingled solid mixture containing a plurality of polymers comprises dissolving a first one of the polymers in a solvent at a first lower temperature to form a first preferably single phase solution and a remaining solid component. The solid component contains additional polymers which are not soluable to the solvent at the first temperature but which may be soluble at higher temperatures. The method includes subsequently heating the solvent to dissolve additional polymer from the solid component to form subsequent solutions. The polymers are then separated from their respective solution either using flash evaporation techniques when more than one polymer has been dissolved at a single temperature, or conventional techniques for extracting a polymer from a solvent in a solution.

11 Claims, 2 Drawing Sheets

POLYMER RECYCLING BY SELECTIVE DISSOLUTION

FIELD AND BACKGROUND OF THE INVENTION

The present invention relates in general to a technique for separating or recycling plastics, and in particular, to a new and useful method and apparatus for dealing with streams of physically commingled plastics, such plastic streams arising in any of a variety of reclaiming or recycling operations.

For the purpose of this disclosure, commingled plastics mean a mixture of chemically different plastics, wherein particles in the mixture consist primarily of single types of plastics, as might result when a variety of plastic packaging materials are mixed together and coarsely ground. Although not confined to such streams, an important application of the invention is to the commingled, post-consumer plastics that result when plastics are separated from ordinary household trash. Such plastic mixtures may also include minor amounts of paper, metals, glass and other substances. The mixture may also contain particles consisting of more than one kind of plastic, as for example when multiwall films or bottles are the source of the plastic particles. Such composite materials, including impact-modified plastics, may also be treated by the present invention.

Individual plastics have long been reclaimed as part of pre-consumer manufacturing operations. Commingled plastics, in particular those in household waste, have more commonly been land-filled or burned. The typical household waste is substantially composed of the following plastics: polyvinyl chloride (PVC), polystyrene (PS), low density polyethylene (LDPE), high density polyethylene (HDPE), polypropylene (PP) and polyethylene terephthalate (PET). Some technology, primarily of European origin, extrudes commingled plastics into low-value articles, such as wood substitutes. The various techniques for directly utilizing commingled plastics reclaim at best a small portion of the value of the original component plastics. Typically, the value as a fuel or as a wood-substitute will be less than ten percent of the value of the original plastics. Incentive thus exists to separate a commingled plastics stream into its component polymers.

Commercial and semi-commercial recycling schemes have typically resorted to manual sorting of containers prior to a grinding step and further separation techniques such as flotation and hydrocycloning. This has been successfully applied to certain well-defined recycle streams such as returned, soft-drink bottles. Problems remain, however, even when these streams are separated from metals, paper, and other wastes. The major difficultly is that the plastics themselves are mixtures. This problem is of an increasing complexity with the advent of multi-layered containers. Separation techniques have been even less successful for the complex mixtures typical of general post-consumer trash, and are unsuccessful whenever the component polymers have similar specific gravities.

Simple coextrusions of commingled plastics produce composites with little strength. A major reason for this is thermodynamic incompatibilities between the component polymers. Most pairs of polymers are incompatible and form two phases upon mechanical mixing. This incompatibility typically leads to poor physical properties unless one of the components is microdispersed in the other (see U.S. Pat. Nos. 4,594,371 and 4,666,961 to Nauman). To this end incentives exist to separate waste plastic streams into pure polymers or at least render innocuous certain components that may cause difficulties in fabrication or lead to poor physical properties in a mechanical blend.

Articles which disclose work that focuses on the impact modification of polymers via flash evaporation and compositional quenching are:

1. Nauman, E. B., Ariyapadi, M., Balsara, N. P., Grocela, T., Furno, J., Lui, S., and Mallikarjun, R., "Compositional Quenching: A Process for Forming Polymer-in-Polymer Microdispersions and Interpenetrating Networks", Chem. Eng. Commun., 66, 29–55 (1988);
2. Balsara, N. P. and Nauman, E. B., "The Entropy of Inhomogeneous Polymer-Solvent Systems", J. Poly. Sci.: Part B, Poly. Phys., 26, 1077–1086 (1988);
3. Balsara, N. P. and Nauman, E. B., "Spinodal Decomposition in Polymer-Polymer Solvent Systems Induced by Continuous Solvent Removal", Proc. ACS Div. of Poly. Matls., 57. 637–642 (1987);
4. Nauman, E. B., Wang, S-T., Balsara, N. P., "A Novel Approach to Polymeric Microdispersions", Polymer, 27, 1637–1640 (1986);
5. Nauman, E. B., Balsara, N. P., "Phase Equilibria and the Landau-Ginzberg Functional" Fluid Phase Equilibria, 45, 229–250 (1988); and
6. Nauman, E. B., Balsara, N. P., "Spacially Local Minimizers of the Landau-Ginzberg Functional", Quart, Rev. Appl. Math, XLVI 375–379 (1988).

SUMMARY OF THE INVENTION

The same thermodynamic differences which reduce the strength of products made from commingled plastics, provide an opportunity for separation by selective dissolution according to the present invention.

It is well known that polymers have different solubility characteristics, and extensive lists of solvents for particular polymers have been developed. Great emphasis has been placed on finding solvents which will dissolve particular polymers at room temperature and atmospheric pressure. Less well known is the fact that many chemical compounds which are nonsolvents for a particular polymer at room temperature and atmospheric pressure become good solvents at sufficiently high temperatures and pressures.

One novel aspect of this invention is the selective dissolution of individual polymeric species from a commingled mixture by using a number of solvents which is small compared to the number of polymeric components. This can be accomplished by contacting the commingled mixtures with the solvent at one temperature and pressure to dissolve one or more components, removing the solvent together with the dissolved polymer, contacting the remaining plastics mixture with fresh solvent at a higher temperature and pressure, dissolving additional polymeric components, and so on. This procedure continues through a set of temperatures and pressures until a maximum temperature and pressure is reached. Remaining at this point will be residual insolubles such as glass, metals, cellulosics and possibly some polymers which remained insoluble even at the highest dissolution temperatures.

The dissolution process of the present invention is subject to a number of constraints and limitations which are not apparent in view of the simplicity of the process. The temperature and pressure at dissolution conditions are constrained by the vapor-liquid behavior of the pure solvent for example. The dissolved polymer concentrations in the process are maintained at less than about 20% by weight. This means that the polymer will have little effect on the vapor-liquid equilibrium behavior of the solvent. At a fixed temperature therefore, the minimum pressure at dissolution conditions is the vapor pressure of the solvent. Higher pressures are possible through the addition of other gases but they offer no special advantages except coincidently for atmospheric dissolutions using solvents with a vapor pressure that is less than atmospheric pressure.

The normal temperature range suitable for the dissolution step is from room temperature to about 250° C. A refrigerated solvent could allow separation of two polymers which are both soluble at room temperature. Given the variety of process options that exist for the invention, however, this possibility has not yet been explored. The upper temperature limit is the temperature at which the most difficult to dissolve polymers begin to degrade. Degradation becomes significant for most polymers at about 250° C. If a thermally sensitive polymer such as polyvinylchloride is the last to dissolve, the upper temperature limit will be considerably reduced. There is no method for reliably predicting incipient polymer solubilities in a given solvent. Solubility must be measured experimentally for each polymer of interest.

The usual lower limit for pressure is one atmosphere. Subatmospheric pressures could be used with low volatility solvents. The high pressure limit will normally be imposed by equipment limitations, but for low volatility solvents, could be imposed by the degradation temperature of the polymer. Dissolution at supercritical conditions is possible.

The normal operating range for the weight percent polymer in the solution is from about 5% to about 20%. The overall range is the result of an economic trade-off. Low concentrations mean low solution viscosities and fast dissolution times but relatively high recovery costs. Additional constraints may exist for particular applications. As one example, if tetrahydrofuran (THF) is used to dissolve a mixture containing polystyrene (PS) and polyvinylchloride (PVC) which both dissolve at room temperature, and other polymers which dissolve at elevated temperatures, then the first dissolution fraction will contain both PS and PVC in solution. If this liquid fraction is recovered directly, then a mixture or PS and PVC will result. Such a mixture would have little value unless one of the components was in substantial excess, say greater than 90% PS or greater than 90% PVC. Then the minor component could be microdispersed and rendered relatively innocuous by following the teachings of U.S. Pat. No. 4,594,371 and by practicing the process of compositional quenching. This process requires a single phase solution before solvent removal by flash devolatilization. Single phase solutions of PVC and PS generally require polymer concentrations less than about 5% by weight when the two polymers are in a 1 to 1 ratio and less than about 10% when the two polymers are in a 9 to 1 or 1 to 9 ratio. Thus, for this example, a total polymer concentration of less than about 10% by weight is required to microdisperse minor amounts of PS in PVC or vice versa.

Suppose now that the relative PS and PVC concentrations are inside the 9 to 1 range, (e.g., 70% PS and 30% PVC). Then, a microdispersion of the minor component (e.g., the PVC) in the major component (e.g., the PS) might not be possible according to the teaching of U.S. Pat. No. 4,594,371 and the directly recovered mixture would be expected to have poor physical properties. Several avenues exist to overcome this problem. One possibility which, however, has not been established by actual experiment, would be to refrigerate the THF in the hope that a temperature could be found for dissolving one polymer and not the other. A second possibility is to use another solvent. For example, methylene chloride will dissolve PS at room temperature but not PVC. A third possibility, likely to be the best from an economic viewpoint, is to co-dissolve the PS and PVC under conditions that lead to two liquid phases. It has been found that two liquid phases result whenever the total polymer concentration is greater than about 10% by weight and the relative ratio of PS and PVC is less than about 9 to 1 and also less than about 1 to 9. It has further been found that the resulting phases have sufficient density differences so that separation by decantation or liquid centrifugation is readily possible.

The above example of optimal polymer concentrations was specific to the case of PS and PVC dissolved in THF. However, the general behavior, including the concentration and relative ratios given above, is approximately true for many pairs of polymers dissolved in a common solvent. Thus the guidelines for choosing polymer concentrations in the selective dissolution process are as follows:

1. If a single polymer is dissolved at a given temperature, the range of polymer concentrations is from about 5% to about 20% by weight.
2. If two or more polymers are co-dissolved at a given temperature, there are two subranges, the choice between them depending on the intent of the process.
   2a. If the intent is to microdisperse minor components, the range will be from about %5 to about 10%. However, the overriding criterion is that the solution be single phase.
   2b. If the intent is to form two liquid phases for subsequent separation, the range will be from about 10% to about 20%. The overriding criterion is now that the solution forms two liquid phases.

Limits exist on the concentrations of a polymer within a commingled mixture for which it is feasible to separate that polymer by selective dissolution. A lower limit on the polymer concentration in the commingled mass is imposed by the difficultly of contacting the entire mass with solvent and then removing most of the resulting solution while still maintaining a minimum polymer concentration in the solvent of 5% by weight. This lower limit is about 5% of the total mass of commingled plastics still remaining at the given stage of dissolution. For those components which dissolved at room temperature, this means a minimum content in the starting mixture of about 5% by weight. For a component that dissolves at or near the end of the temperature sequence, the minimum content in the starting mixture can be well less than 5% since the relative content of this component increases as the other components are dissolved.

Accordingly, an object of the present invention is to provide a method which is capable of separating a plurality of generally incompatible polymers, from a physically commingled solid mixture of the polymers.

Another object of the present invention is to provide an economically feasible technique for recycling commingled polymer mixtures, such as those found in household waste.

A still further object of the present invention is to provide a method for separating polymers from a physically commingled solid mixture containing a plurality of polymers, by selective dissolution using one or more solvents at different temperatures for selectively dissolving single or paired polymers from the mixture.

A further object of the present invention is to subsequently separate the paired polymers from single phase solutions containing the polymers using a flash evaporation or compositional quenching technique.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

DESCRIPTION OF THE PREFERRED EMBODIMENTS

Figure 1:
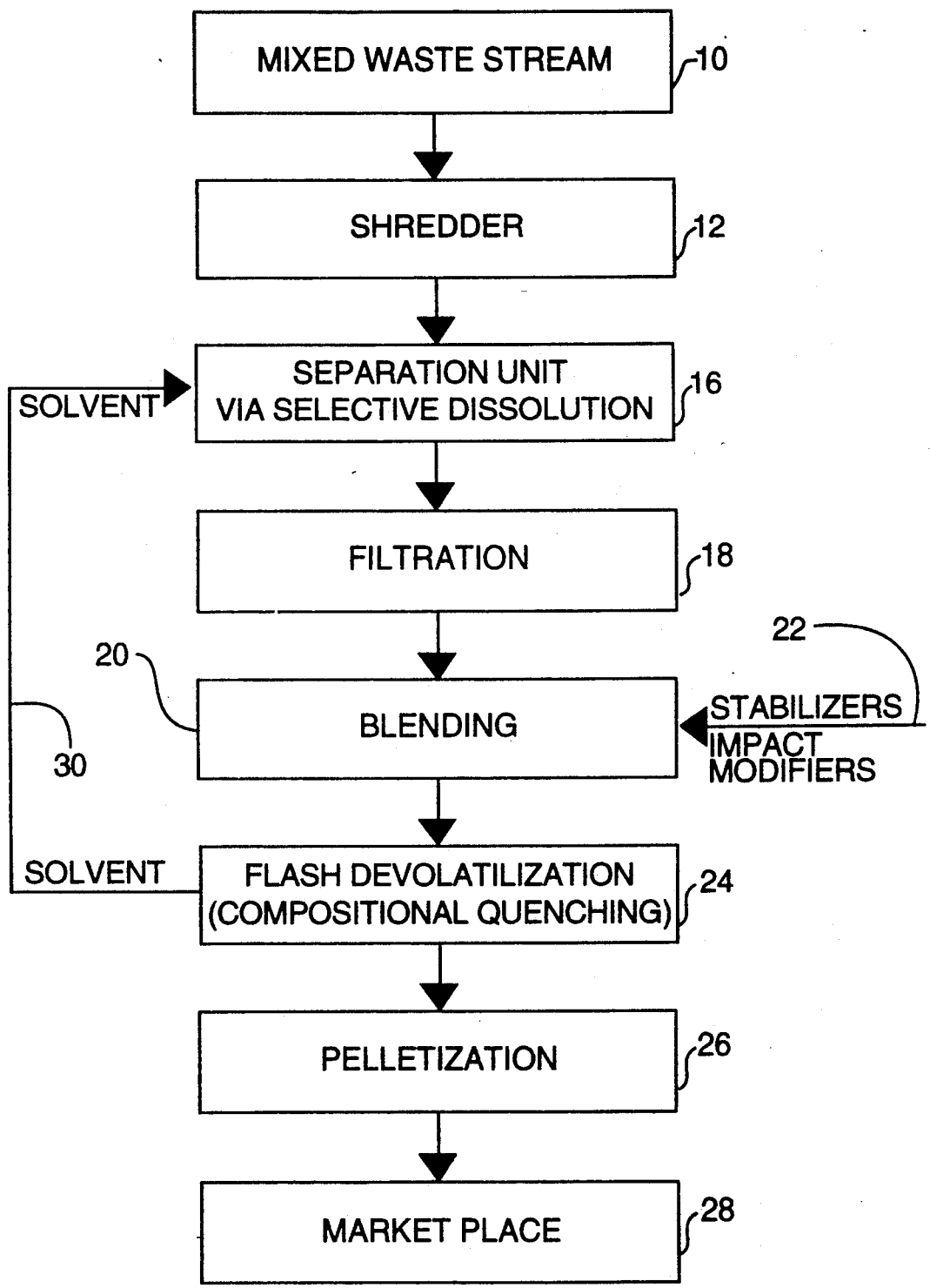
FIG. 1 is a flow diagram illustrating a polymer reclamation process including the present invention.

FIG. 1 is a flow diagram of the polymer reclamation process of the present invention. A mixed waste stream of plastics 10 is collected for example using known techniques. The stream is subjected to shredding in a shredder 12 of known design. The commingled polymers 14 thus formed are then separated using a controlled sequence of solvents and solvation temperatures according to the present invention at 16. Dissolution is fast at the low polymer concentrations used in the process. At these low concentrations, viscosity is low making filtration feasible. The filtration step 18 is used to remove insoluble contaminates such as metals, glass, cellulose and some pigments. Since the polymers are in solution this affords an opportune time to add stabilizers and impact modifiers 22 in a blending step 20. Once separated, flash devolatilization combined with conventional devolatilization techniques 24 are used to produce solvent free polymers. Flash devolatilization and compositional quenching will also microdisperse minor components and impurities rendering them innocuous. When selective dissolution is used in conjunction with flash devolatilization and compositional quenching, the resulting polymers are pelletized at 26 and exhibit near first pass physical properties for marketing 28. The solvent is recycled at 30 to alleviate both economical and environmental concerns of a solvent based process.

Figure 2:
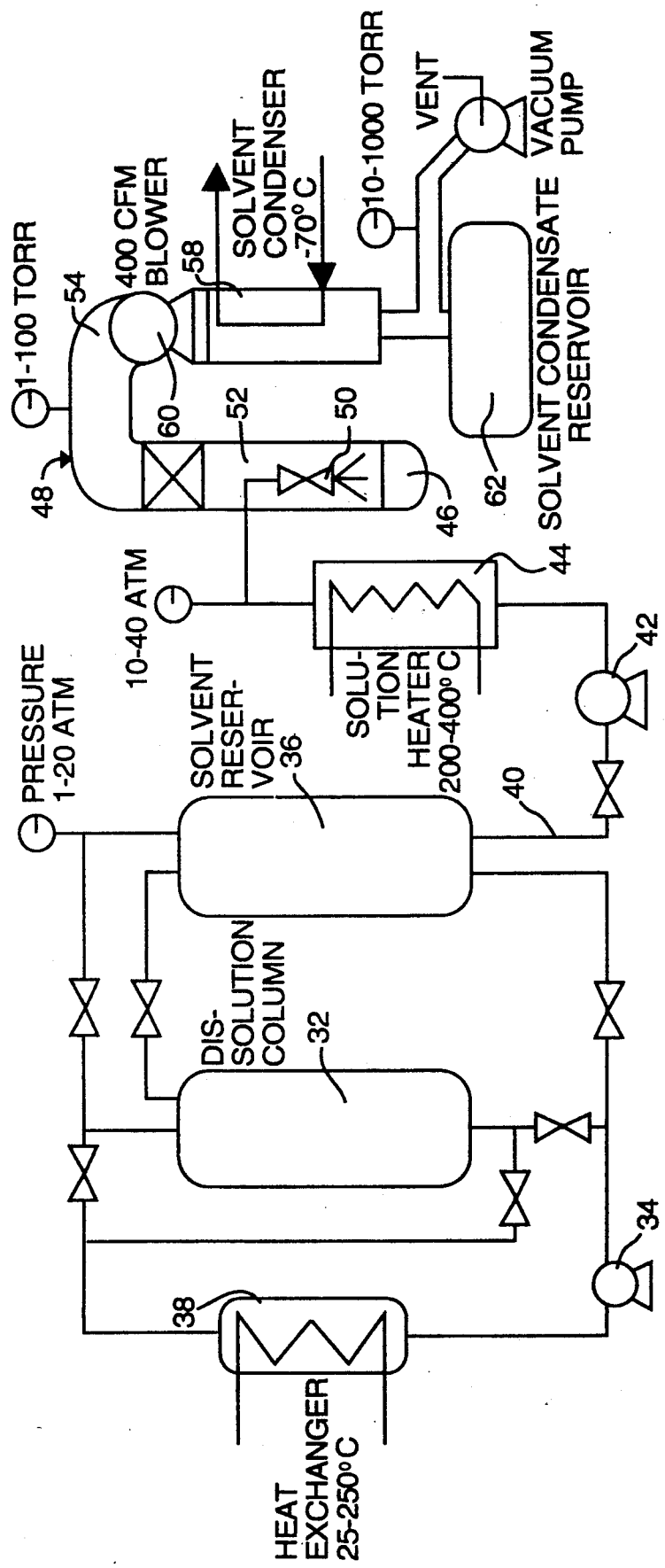
FIG. 2 is a schematic illustration of apparatus used to practice the present invention.

FIG. 2 illustrates an example of a bench scale dissolution apparatus for the present invention. Commingled plastic waste e.g. at 14 in FIG. 1, typically 25 kg, is placed in the dissolution column 32 with screen packs at both ends. A stirred vessel would be preferred in a larger scale system but a column is a suitable substitution on this scale due to its ease of fabrication. A gear pump 34 is used to circulate solvent, typically 20 liters, from a reservoir 36 through a heat exchanger 38 and the dissolution column 32. Selective dissolution is performed in a sequential batch mode.

A unique temperature for a given solvent is set in heat exchanger 38 and is used to selectively extract a single polymer group from the commingled stream at 40. The polymer obtained from a single extraction is isolated via flash devolatilization in a flash chamber 48 as will be explained in detail below. The recovered polymer is pelletized, while the recovered solvent is returned to the reservoir 36 to extract the next polymer group at a higher temperature.

It is this series of controlled temperature-solvent extractions which facilitates the separation of individual polymers or polymer pairs from a commingled waste stream.

The equipment used for the compositional quenching or flash evaporation step according to the present invention is schematically shown at the right in FIG. 2. The single phase polymer solution 40 from reservoir 36 is first metered by a positive displacement pump 42 through a second heat exchanger 44 in order to accept heat which will ultimately be used to vaporize the solvent. The polymer solution is typically heated to 200° to 400° C. This temperature is one of the independent variables that govern the devolatilization step. In order to prevent the solvent in the solution from boiling within the heat exchanger 44 and in the connecting lines before it reaches a flash chamber 48, the heated solution is kept under relatively high pressure, typical from 10 to 40 atm. This heated, pressurized solution is then flashed across a flash valve 50 into an evacuated chamber 52 in flash chamber 48. Most of the solvent rapidly vaporizes and exits through the top 54 of the flash chamber 48, leaving behind a single polymer or a two phase polymer blend at 46. The solvent vapors are then supplied to and condensed in a condenser 58 by a blower 60, collected in a collection tank 62, and recycled. The polymer blend 46 is collected at the bottom of the flash chamber 48 for further processing.

If there is a two phase polymer blend at 46, phase separation occurs when the solvent is rapidly removed by flash devolatilization. The devolatilization step is fast and it plunges the residual, polymer/polymer/ solvent mixture deep into a region of two phases. Phase separation occurs by spinodal decomposition and generates a microdispersion with a characteristic and small phase separation distance. If one of the phase volumes is small, a uniformly sized dispersion will result.

The low solids flash devolatilization of FIG. 2 is a relatively simple process which is readily scalable. The dissolution step at the left is typically batch, but the flash devolatilization process at the right is continuous thereafter. The flash chamber pressure, typically 5–100 torr, is the other independent variable that governs devolatilization along with temperature. Together temperature and pressure determine the polymer concentration after the flash, typically 50–95%, and the after flash temperature, typically 0°–100° C. To a first approximation, the flash achieves vapor-liquid equilibrium.

The following examples of selective dissolution processes have been devised in reference to typical compositions of U.S. post-consumer packaging materials and using the apparatus of FIG. 2. The plastics portion of such waste is distributed between six major polymers: PS, PVC, polypropylene (PP), low density polyethylene (LDPE), high density polyethylene (HDPE), and polyethylene terephthalate (PET). Tetrahydrofuran (THF) was selected first as a trial solvent due to the vast data base accumulated in prior compositional quenching work. The commingled polymer sample was prepared using equal volumes of virgin polymers from the major packaging groups: PVC, PS, PP, LDPE, HDPE, and PET.

Example 1—THF Based

Codissolve PS and PVC at room temperature and subsequently separate by decantation. Two liquid phases exist at 10% total dissolved polymer provided the relative PS concentration is in the range of about 10% to about 90%.

Dissolve LDPE at 65° C.

Codissolve HDPE and PP at 160° C. Recover these products simultaneous as an intimate mixture.

Dissolve PET at 190° C.

The maximum pressure achieved in this process was approximately 17 atm.

Example 2—Xylene Based

Dissolve PS at room temperature.
Dissolve LDPE at 75° C.
Dissolve HDPE at 105° C.
Dissolve PP at 118° C.
Dissolve PVC at 138° C.

Recover PET as undissolved residue. (This fraction can be purified by a separation dissolution step, e.g., by using THF at 190° C.).

The maximum pressure achieved in this process was 1 atm, excluding the separate PET dissolution step.

Example 3—Toluene Based

Dissolve PS at room temperature.
Dissolve LDPE at 50° C.
Codissolve HDPE and PP at 105° C. Recover these products simultaneously as an intimate mixture.

Recover PVC and PET as undissolved residue. (Several options exist to separate this fraction. The toluene-based process could be extended to pressures above 1 atm to dissolve the PVC. A second solvent could also be used).

The maximum pressure achieved in this process was 1 atm.

The above processes were validated experimentally using mixed pellets of pure commercial polymers. Dissolution efficiency measurements showed approximately 100% selectivity during each of the dissolution steps.

Once in solution at concentrations from about 5% to about 20% by weight, the polymer can be recovered by any conventional means. For example, steam stripping or coagulation with a nonsolvent (e.g., methanol) can be used to recover substantially pure polymer. The preferred embodiment of this invention is to use flash devolatilization for at least the first step in the recovery process. When flash conditions are adjusted to give about 50% polymer after the flash, the art in U.S. Pat. No. 4,594,371 may be followed to obtain a microdispersion or in U.S. Pat. No. 4,666,961 to obtain a cocontinuous network. Even when the starting solution contains only one polymer, the same flash conditions will generally be suitable.

In treating commingled mixtures containing the major packaging polymers (PS, PVC, PP, LDPE, HDPE), some special process features may be advantageous. The PS so recovered will be of the unmodified or general purpose variety normally used for food-contact applications. Such use is conjectural for the recycled polymer. An alternative is to add dissolved rubber (including block copolymers of rubber and PS) to the solution and then to produce impact or rubber modified polystyrene following the teaching of U.S. Pat. No. 4,594,371. In this application, the addition of some styrene monomer may be advantageous to partially crosslink the rubber phase. Impact modification of the PVC, PP and PET fractions can be achieved similarly. For the case of PP, dissolution conditions can be arranged to allow some codissolution of polyethylene which will serve as an impact modifier directly.

Commingled plastic mixtures may contain a great variety of polyolefins including LDPE, HDPE, PP, plus copolymers of ethylene, propylene, and higher olefins. In particular, they may contain linear, low density polyethylene (LLDPE) made by the low pressure process. Clean splits of all components cannot be expected in this case. Instead, there will be partial codissolution of the various copolymers such as LLDPE. The three fractions in Example 2 (xylene) may still be taken. Alternatively, it may be desirable to codissolve all the polyolefins. This can be accomplished by using the highest temperature for the polyolefin fractions without dissolution at intermediate temperatures.

Example 4—THF Based, 3 Cut Process

Codissolve PS and PVC at room temperature as in Example 1.
Codissolve all polyolefins at 160° C.
Dissolve PET at 190° C.

Example 5—Xylene Based, 4 Cut Process

Dissolve PS at room temperature.
Dissolve all polyolefins at 118° C.
Dissolve PVC at 138° C.
Recover PET as in Example 2.

In all the above examples, the dissolution temperatures represent nominal lower limits for the indicated cut. The upper limit is the next highest temperature in the sequence. For example, the PS dissolution in Example 5 could be conducted at temperatures up to about 118° C. Use of higher than minimum temperatures may be advantageous to decrease dissolution times or to improve drainage of the solution from the residual mass. In this sense, all the room temperature dissolution steps are done at temperatures higher than the theoretical minimum.

Some packaging materials are multilayer coextrusions or other forms of physical blend containing two or more different polymers. The selective dissolution process described herein will work for bilayer materials since both polymers will be in contact with the solvent. It will not work, or at least not as well, in multicomponent materials when an inner-layer or dispersed phase would normally dissolve at a lower temperature than the outer material. In this case, the entire composite would dissolve at the higher temperature and a cosolution would result.

The need to control the polymer solution concentration implies a need to know the relative polymer amounts in the original commingled mass. The relative amounts can be determined using selective dissolution as an assay method.

Example 6 - Assay Method for Commingled Packaging Resins

Dissolve with methylene chloride at room temperature. Report results as "PS".

Dissolve with THF at room temperature. Report results as "PVC".

Dissolve with xylene at 75° C. Report results as "LDPE".

Dissolve with xylene at 105° C. Report results as "HDPE".

Dissolve with xylene at 118° C. Report results as "PP".

Dissolve with ethylene glycol at 180° C. Report as "PET".

The above assay method might also be practiced as a recycling process. However, it is unlikely to be economical due to the large number of solvents.

Table 1 shows dissolution temperatures for the various polymers and solvents of Examples 1 to 5.

TABLE 1

| DISSOLUTION TEMPERATURES | | | |
|---|---|---|---|
| Polymers | THF | Toluene | Xylene |
| PVC | RT | NS | 138 |
| PS | RT | RT | RT |
| PP | 160 | 105 | 118 |
| LDPE | 65 | 50 | 75 |
| HDPE | 160 | 105 | 105 |
| PET | 190 | NS | NS |

RT = room temperature
NS = not soluble
T = °C.

The present invention is seen as being one of the key answers to polymer reclamation. Using THF for example, the invention demonstrates a four way split of the six major packaging plastics. Preliminary indications are that solvents exist to separate cleanly all six major plastic groups With greater than 99% separation efficiencies, compositional quenching will microdisperse the minor components and render them innocuous. It is considered that a split which contains the PP and HDPE will exhibit good physical properties.

For a PVC and PS split, if THF is used as the dissolution solvent, a second solvent, e.g. methylene chloride, can even be used to extract the PS prior to the room temperature THF extraction for example.

The invention is capable of yielding slightly contaminated polymers which have near virgin polymer properties for re-use and re-sale.

Preliminary economic study shows that application of this invention on a scale of 50 MM pounds per year can be accomplished for less than 15 cents per pound.

While specific embodiments of the invention have been shown and described in detail to illustrate the application of the principles of the invention, it will be understood that the invention may be embodied otherwise without departing from such principles.

What is claimed is:

1. A method for separating polymers from a physically commingled solid mixture containing at least three polymers, by selective dissolution, comprising:
   dissolving at least one first polymer of the mixture in a selected solvent at a first temperature to form a first solution and a first remaining solid component which contains at least two polymers of the mixture which are insoluble in the selected solvent at the first temperature but soluble in the selected solvent at higher temperatures;
   separating the first solution from the first remaining solid component;
   separating the at least one first polymer from the selected solvent of the first solution;
   dissolving at least one second polymer from the first remaining solid component int eh selected solvent at a second temperature to form a second solution and a second remaining solid component which contains at least one third polymer of the mixture which is insoluble in the selected solvent at the second temperature but soluble in the selected solvent at a third higher temperature;
   separating the second solution from the second remaining solid component;
   separating the at least one second polymer from the selected solvent of the second solution;
   dissolving at least one third polymer from the second remaining solid component int he selected solvent at the third higher temperature to form a third solution;
   separating the at least one third polymer from the selected solvent of the third solution;
   each of the first, second and third solutions initially containing a solid concentration of polymer of from 5% to about 20% by weight; and
   dissolving at least two of the polymers in the solvent at a single temperature simultaneously, one of the simultaneously dissolved polymers being present at concentrations of less than about 10% by weight of the other one of the simultaneously dissolved polymers, the simultaneously dissolved polymers forming a single phase solution.

2. A method for separating polymers from a physically commingled solid mixture containing at least three polymers, by selective dissolution, comprising:
   dissolving at least one first polymer of the mixture in a selected solvent at a first temperature to form a first solution and a first remaining solid component which contains at least two polymers of the mixture which are insoluble in the selected solvent at the first temperature but soluble in the selected solvent at higher temperatures;
   separating the first solution from the first remaining solid component;
   separating the at least one first polymer from the selected solvent of the first solution;
   dissolving at least one second polymer from the first remaining solid component int eh selected solvent at a second temperature to form a second solution and a second remaining solid component which contains at least one third polymer of the mixture which is insoluble in the selected solvent at the second temperature but soluble in the selected solvent at a third higher temperature;
   separating the second solution from the second remaining solid component;
   separating the at least one second polymer from the selected solvent of the second solution;
   dissolving at least one third polymer from the second remaining solid component int he selected solvent at the third higher temperature to form a third solution;
   separating the at least one third polymer from the selected solvent of the third solution;
   each of the first, second and third solutions initially containing a solid concentration of polymer of from 5% to about 20% by weight; and
   simultaneously dissolving two of the polymers of the mixture in the solution at a single temperature to form a two phase solution, the solution containing more than about 10% of one of the simultaneously dissolved polymers as compared to the other simultaneously dissolved polymer.

3. A method for separating polymers from a physically commingled solid mixture containing at least three polymers, by selective dissolution, comprising:
  dissolving at least one first polymer of the mixture in a selected solvent at a first temperature to form a first solution and a first remaining solid component which contains at least two polymers of the mixture which are insoluble in the selected solvent at the first temperature but soluble in the selected solvent at higher temperatures;
  separating the first solution from the first remaining solid component;
  separating the at least one first polymer from the selected solvent of the first solution;
  dissolving at least one second polymer from the first remaining solid component int eh selected solvent at a second temperature to form a second solution and a second remaining solid component which contains at least one third polymer of the mixture which is insoluble in the selected solvent at the second temperature but soluble in the selected solvent at a third higher temperature;
  separating the second solution from the second remaining solid component;
  separating the at least one second polymer from the selected solvent of the second solution;
  dissolving at least one third polymer from the second remaining solid component int he selected solvent at the third higher temperature to form a third solution;
  separating the at least one third polymer from the selected solvent of the third solution;
  each of the first, second and third solutions initially containing a solid concentration of polymer of from 5% to about 20% by weight; and
  at least one of the first and second solutions comprising a two phase solution produced by simultaneously dissolving two polymers in the solvent at the same temperature, the two phases of the two phase solution having different densities, one of the simultaneously dissolved polymers being present at more than about 10% of the other simultaneously dissolved polymer.

4. A method for separating polymers from a physically commingled solid mixture containing at least three polymers and including PVC and PET, by selective dissolution, comprising:
  dissolving at least one first polymer of the mixture in a selected solvent at a first temperature to form a first solution and a first remaining solid component which contains at least two polymers of the mixture which are insoluble in the selected solvent at the first temperature but soluble in the selected solvent at higher temperatures, the solvent being selected to dissolve PVC but not PET;
  separating the first solution from the first remaining solid component;
  separating the at least one first polymer from the selected solvent of the first solution;
  dissolving at least one second polymer from the first remaining solid component int eh selected solvent at a second temperature to form a second solution and a second remaining solid component which contains at least one third polymer of the mixture which is insoluble in the selected solvent at the second temperature but soluble in the selected solvent at a third higher temperature;
  separating the second solution from the second remaining solid component;
  separating the at least one second polymer from the selected solvent of the second solution;
  dissolving at least one third polymer from the second remaining solid component int he selected solvent at the third higher temperature to form a third solution;
  separating the at least one third polymer from the selected solvent of the third solution; and
  each of the first, second and third solutions initially containing a solid concentration of polymer of from 5% to about 20% by weight.

5. A method for separating polymers from a physically commingled solid mixture containing at least three polymers and including PS PVC, PET and mixed polyolefins, by selective dissolution, the polyolefins being selected from the group consisting of LDPE, HDPE, and PP the method comprising:
  dissolving at least one first polymer of the mixture in a selected solvent at a first temperature to form a first solution and a first remaining solid component which contains at least two polymers of the mixture which are insoluble in the selected solvent at the first temperature but soluble in the selected solvent at higher temperatures, the solvent being selected to dissolve PVC but not PET;
  separating the first solution from the first remaining solid component;
  separating the at least one first polymer from the selected solvent of the first solution;
  dissolving at least one second polymer from the first remaining solid component int eh selected solvent at a second temperature to form a second solution and a second remaining solid component which contains at least one third polymer of the mixture which is insoluble in the selected solvent at the second temperature but soluble in the selected solvent at a third higher temperature;
  separating the second solution from the second remaining solid component;
  separating the at least one second polymer from the selected solvent of the second solution;
  dissolving at least one third polymer from the second remaining solid component int he selected solvent at the third higher temperature to form a third solution;
  separating the at least one third polymer from the selected solvent of the third solution; and
  each of the first, second and third solutions initially containing a solid concentration of polymer of from 5% to about 20% by weight.

6. A method for separating polymers from a physically commingled solid mixture containing at least three polymers, by selective dissolution, comprising:
  dissolving at least one first polymer of the mixture in a selected solvent at a first temperature to form a first solution and a first remaining solid component which contains at least two polymers of the mixture which are insoluble in the selected solvent at the first temperature but soluble in the selected solvent at higher temperatures;
  separating the first solution from the first remaining solid component;
  separating the at least one first polymer from the selected solvent of the first solution;

dissolving at least one second polymer from the first remaining solid component int eh selected solvent at a second temperature to form a second solution and a second remaining solid component which contains at least one third polymer of the mixture which is insoluble in the selected solvent at the second temperature but soluble in the selected solvent at a third higher temperature;

separating the second solution from the second remaining solid component;

separating the at least one second polymer from the selected solvent of the second solution;

dissolving at least one third polymer from the second remaining solid component int he selected solvent at the third higher temperature to form a third solution;

separating the at least one third polymer from the selected solvent of the third solution;

each of the first, second and third solutions initially containing a solid concentration of polymer of from 5% to about 20% by weight; and the at least three polymers comprsing at least three different polyolefins, one of the polyolefins being in each of the first, second and third solutions respectively.

7. A method for separating polymers from a physically commingled solid mixture containing a plurality of polymers, by selective dissolution, comprising:

dissolving at least a first one of the polymers of the mixture in a solvent at a first temperature to form a first solution and a remaining solid component which contains at lest one second polymer which si insoluble in the solvent at the first temperature but soluble in the solvent at a second higher temperature;

separating the first solution from the remaining solid component;

separating the at least one first polymer from the solvent of the first solution;

dissolving the at least one second polymer from the remaining solid component in the solvent at the second temperature to form a second solution;

separating the at least one second polymer from the solvent of the second solution;

the solvent being THF and the mixture containing PS, PVC, LDPE, HDPE, PP and PET; and dissolving the PS and PVC at room temperature to form the first solution, dissolving the LDPE at about 65° C. to form the second solution, subsequently dissolving the HDPE and PP at about 160° C. in the solvent to form a third solution and dissolving the PET at about 190° C. to form a fourth solution.

8. A method for separating polymers from a physically commingled solid mixture containing a plurality of polymers, by selective dissolution, comprising:

dissolving at least a first one of the polymers of the mixture in a solvent at a first temperature to form a first solution and a remaining solid component which contains at lest one second polymer which si insoluble in the solvent at the first temperature but soluble in the solvent at a second higher temperature;

separating the first solution from the remaining solid component;

separating the at least one first polymer from the solvent of the first solution;

dissolving the at least one second polymer from the remaining solid component in the solvent at the second temperature to form a second solution;

separating the at least one second polymer from the solvent of the second solution;

the mixture including PS, LDPE, and PET and the solvent comprising xylene; and dissolving the PS at room temperature in the xylene to form the first solution, dissolving the LDPE at about 75° C. in the xylene to form the second solution, dissolving the HDPE t about 105° C. int eh xylene to form a third solution, dissolving the PP at about 118° C. in the xylene to form a fourth solution, dissolving the PVC at about 138° C. in the xylene to form a fifth solution and recovering PET undissolved.

9. A method for separating polymers from a physically commingled solid mixture containing a plurality of polymers, by selective dissolution, comprising:

dissolving at least a first one of the polymers of the mixture in a solvent at a first temperature to form a first solution and a remaining solid component which contains at lest one second polymer which si insoluble in the solvent at the first temperature but soluble in the solvent at a second higher temperature;

separating the first solution from the remaining solid component;

separating the at least one first polymer from the solvent of the first solution;

dissolving the at least one second polymer from the remaining solid component in the solvent at the second temperature to form a second solution;

separating the at least one second polymer from the solvent of the second solution;

the solvent being toluene and the mixture including PS, LDPE, HDPE, PP, PVC and PET; and dissolving the PS in the toluene at room temperature to form the first solution, dissolving the LDPE at about 50° C. in the toluene to form the second solution, dissolving the HDPE and PP at about 105° C. in the toluene to form a third solution, and recovering the PVC and PET as undissolved residue remaining after formation of the third solutions.

10. A method separating polymers from a physically commingled solid mixture containing a plurality of polymers, by selective dissolution, comprising:

dissolving at least a first one of the polymers of the mixture in a solvent at a first temperature to form a first solution and a remaining solid component which contains at lest one second polymer which si insoluble in the solvent at the first temperature but soluble in the solvent at a second higher temperature;

separating the first solution from the remaining solid component;

separating the at least one first polymer from the solvent of the first solution;

dissolving the at least one second polymer from the remaining solid component in the solvent at the second temperature to form a second solution;

separating the at least one second polymer from the solvent of the second solution;

the first and second solutions initially contain a solid concentration of polymer of from about 5% to about 20% by weight;

at least one of the first and second solutions comprising a single phase solution containing two polymers which were dissolved simultaneously by the solvent at a single temperature, one of the polymers int eh single phase solution being present at about 5% to 10% by weight of the other polymer in the single phase solution;

heating the single phase solution to a flash evaporation temperature which is sufficiently high to evaporate at least some of the solvent at a selected reduced pressure;

maintaining the heated single phase solution at an elevated pressure above the selected reduced pressure for preventing the solvent from evaporating; and subsequently exposing the single phase heated solution to a zone at the selected reduced pressure for flash evaporating at least some of the solvent to leave a matrix of one of the simultaneously dissolved polymers having the other simultaneously dissolved polymer microdispersed therein.

11. A method according to claim 10 wherein the selected reduced pressure is from 1–100 torr and the elevated pressure is from 10–40 atm, the single phase solution being heated to a temperature of from 200°–400° C.

* * * * *